United States Patent
Kubota (10) Patent No.: US 9,936,158 B2
(45) Date of Patent: Apr. 3, 2018

(54) IMAGE PROCESSING APPARATUS, METHOD AND PROGRAM

(71) Applicant: CANON KABUSHIKI KAISHA, Tokyo (JP)

(72) Inventor: Akira Kubota, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 87 days.

(21) Appl. No.: 14/560,622

(22) Filed: Dec. 4, 2014

(65) Prior Publication Data
US 2015/0169974 A1  Jun. 18, 2015

(30) Foreign Application Priority Data

Dec. 18, 2013  (JP) .................... 2013-261317

(51) Int. Cl.
| | |
|---|---|
| H04N 5/262 | (2006.01) |
| H04N 5/77 | (2006.01) |
| H04N 9/74 | (2006.01) |
| H04N 1/60 | (2006.01) |
| H04N 1/62 | (2006.01) |

(Continued)

(52) U.S. Cl.
CPC .......... H04N 5/772 (2013.01); G06K 9/00697 (2013.01); G06T 7/90 (2017.01); H04N 1/6008 (2013.01); H04N 1/622 (2013.01); H04N 5/23229 (2013.01); H04N 5/23293 (2013.01); H04N 5/2621 (2013.01); H04N 9/74 (2013.01);
(Continued)

(58) Field of Classification Search
CPC ...... H04N 5/772; H04N 1/6008; H04N 1/622; H04N 5/23293; H04N 5/2621; H04N 9/74; G06K 9/00697; G06T 7/048

USPC .............................. 348/222.1, 239
See application file for complete search history.

(56) References Cited

U.S. PATENT DOCUMENTS

| | | | | | |
|---|---|---|---|---|---|
| 5,412,487 A | * | 5/1995 | Nishimura | ............. | H04N 5/232 348/346 |
| 6,137,903 A | * | 10/2000 | Dichter | ................. | H04N 1/622 358/540 |

(Continued)

FOREIGN PATENT DOCUMENTS

| | | |
|---|---|---|
| JP | H07-274190 | 10/1995 |
| JP | 2004-070837 | 3/2004 |

(Continued)

OTHER PUBLICATIONS

English translation of WO2014115421A1.*

*Primary Examiner* — Zhenzhen Wu
(74) *Attorney, Agent, or Firm* — Fitzpatrick, Cella, Harper & Scinto (57) ABSTRACT

The present invention enables automatic generation of an image in which only an impressive color is kept, without requiring a complicated operation. A digital camera 100 divides an image obtained by an imaging unit 20 into regions based on color information and luminance information, and determines a characteristic object in accordance with a characteristic degree of each region into which the image is divided. Further, a region for keeping a color is set in which the color of the characteristic object is to be kept. A color conversion process is then performed so as to keep the color of the characteristic object in the region for keeping a color, and to change colors of the other regions to an achromatic color.

7 Claims, 10 Drawing Sheets

(51) Int. Cl.
*G06K 9/00* (2006.01)
*G06T 7/90* (2017.01)
*H04N 5/232* (2006.01)

(52) U.S. Cl.
CPC ............ *G06T 2207/10024* (2013.01); *H04N 5/23216* (2013.01)

(56) References Cited

U.S. PATENT DOCUMENTS

| | | | |
|---|---|---|---|
| 7,557,837 B2 | 7/2009 | Takahashi | |
| 8,948,505 B2 | 2/2015 | Ueda et al. | ............. H04N 1/62 |
| 2003/0174869 A1 | 9/2003 | Suarez | .......................... 382/118 |
| 2011/0050915 A1* | 3/2011 | Wang | .................... H04N 5/232 |
| | | | 348/207.99 |
| 2015/0256718 A1* | 9/2015 | Endo | ................. H04N 5/23216 |
| | | | 348/256 |

FOREIGN PATENT DOCUMENTS

| | | |
|---|---|---|
| JP | 2006-211525 A | 8/2006 |
| JP | 2006-268820 | 10/2006 |
| JP | 2007-115109 | 5/2007 |
| JP | 2010-200270 | 9/2010 |
| JP | 2011-071925 | 4/2011 |
| JP | 2012-244337 | 12/2012 |

\* cited by examiner

IMAGE PROCESSING APPARATUS, METHOD AND PROGRAM

BACKGROUND OF THE INVENTION

Field of the Invention

The present invention relates to an image processing apparatus, method and program that perform color conversion to keep a particular color of an image.

Description of the Related Art

Digital cameras have come into widespread use in recent years, and the number of occasions in which digital cameras are being used is increasing for many users, and the needs of users are becoming diversified. To respond to such diversifying needs, a method is available that generates an image in which only an impressive color is kept. According to the aforementioned method, a user is allowed to designate a desired color, and only the color designated by the user is kept as a chromatic color, and the other colors are changed to an achromatic color.

A method for easily generating the above described kind of image is proposed in, for example, Japanese Patent Application Laid-Open No. 2006-211525. According to the technology disclosed in the aforementioned Japanese Patent Application Laid-Open No. 2006-211525, a frame whose position and size can be set by a user is displayed on an electronic view finder screen, a designated color is determined based on color information included in the frame of the image being displayed on the electronic view finder, and colors other than the designated color that was determined are erased.

An image in which only a particular color is kept as a chromatic color can be easily generated by the technology disclosed in the aforementioned Japanese Patent Application Laid-Open No. 2006-211525. However, even though generation of the image is easy, it is still necessary for the user to perform operations such as setting a frame, and a problem still remains in the respect that it is necessary for the user to perform a complicated operation.

Further, there is the problem that if there is an environmental change or the like after the user has confirmed the color to be kept at a certain time point, a process to keep the color desired by the user will not be correctly performed.

SUMMARY OF THE INVENTION

The present invention has been conceived in view of the problems described above, and an object of the present invention is to enable automatic generation of an image in which only an impressive color is kept, without requiring a complicated operation.

According to an aspect of the present invention, an image processing apparatus comprises: an acquiring unit configured to acquire an image; a dividing unit configured to divide the image into object regions corresponding to objects, using at least a color information; a calculating unit configured to calculate an evaluation value indicating a characteristic degree of the object in the image per each of the object regions; a determining unit configured to determine a characteristic object based on the evaluation value calculated by the calculating unit; and a processing unit configured to subject the image to a color conversion process, to keep a color of the characteristic object as a chromatic color in the object region including the characteristic object, and to change a color of the object to an achromatic color in the object region without including the characteristic object.

According to the present invention, an image in which only an impressive color is kept can be generated automatically, without requiring a complicated operation.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
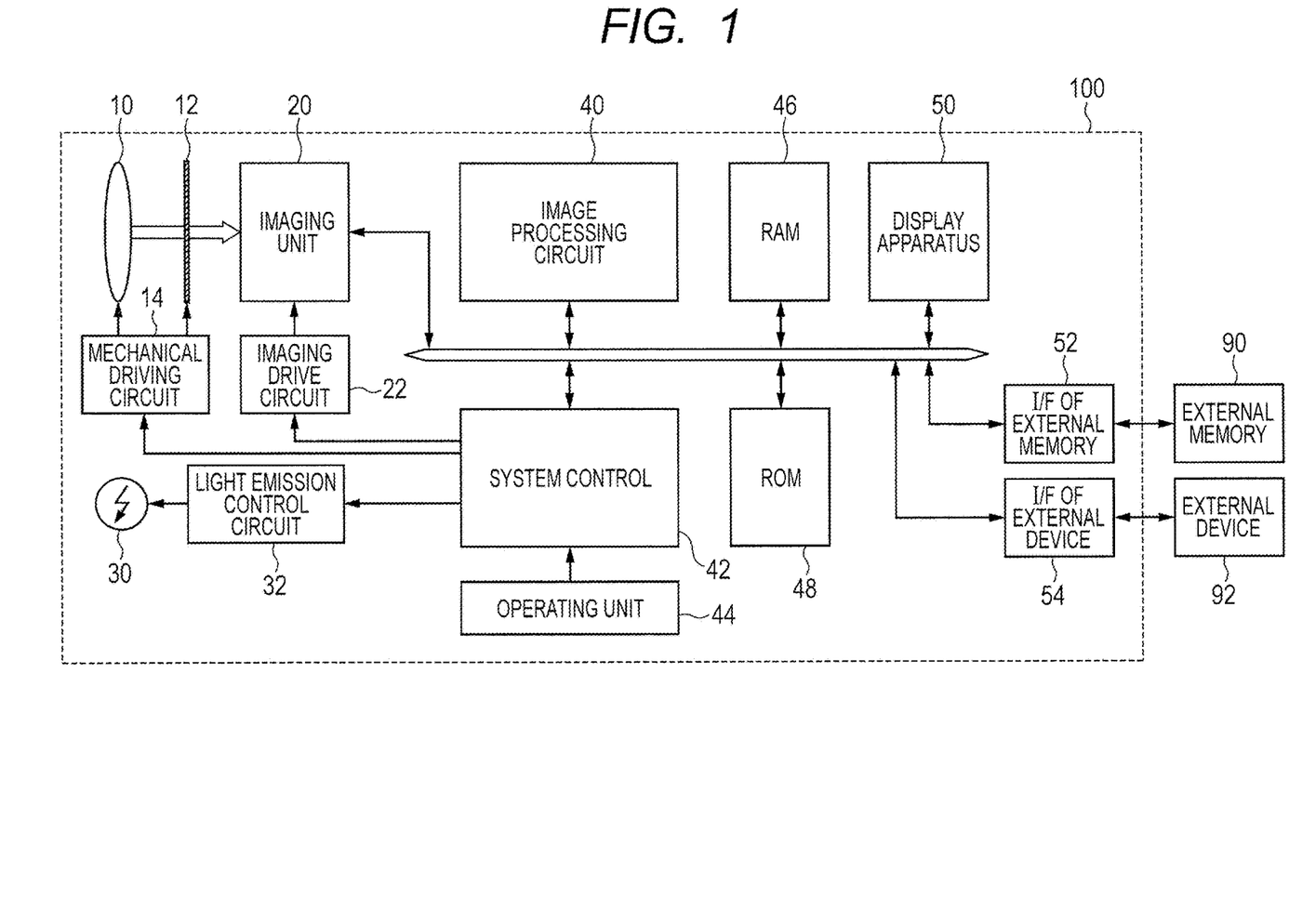
FIG. 1 is a view illustrating the configuration of a digital camera according to an embodiment of the present invention.

A configuration of a digital camera 100 that functions as an image processing apparatus to which the present invention is applied is illustrated in FIG. 1.

A lens 10 condenses light from outside, and leads the light from outside to an imaging element of an imaging unit 20. The lens 10 includes a focusing lens or a zoom lens. It is possible to adjust the focal point or angle of view by driving the lens 10 along an optical axis direction by means of a mechanical driving circuit 14. It is also possible to perform image stabilization by driving the lens 10 in a direction other than the optical axis direction in response to the occurrence of camera shake. Image stabilization can also be realized in a similar manner by moving the imaging unit 20. The quantity of light that passes through the lens 10 is adjusted by a light quantity adjustment mechanism 12. Various methods are available for adjusting the light quantity by means of the light quantity adjustment mechanism 12. Such methods include employing an iris diaphragm that changes the diameter of the aperture, an ND filter that reduces the quantity of transmitted light, and a mechanical shutter that blocks light by completely closing, and these different methods are selectively used depending on the application.

The imaging unit 20 has an imaging element such as a CMOS sensor that receives light of an image of an object that passed through the lens 10 and the light quantity adjustment mechanism 12. A Bayer array that is covered with color filters of R, G, and B is adopted as a pixel array of the imaging element, although the pixel array of the imaging element is not limited thereto. The imaging unit 20 operates in accordance with a drive instruction from an imaging drive circuit 22, and performs operations to expose the light receiving element to light, adjust the exposure quantity, read out exposure data, amplify or attenuate an image signal that is read out, and subject the image signal to A/D conversion and the like. Image data that is output from the imaging unit 20 is introduced to an image processing circuit 40 or is stored in a temporary storage memory 46 such as a RAM.

The image processing circuit 40 performs various kinds of processing such as image processing and image analysis on image data that is input directly from the imaging unit 20 or via the temporary storage memory 46. The image processing circuit 40 extracts a luminance component and a frequency component from image data that is sequentially output from the imaging unit 20, and performs exposure (AE: auto exposure) and focusing (AF: auto focus) when imaging by using the luminance component and frequency component as evaluation values. The image processing circuit 40 can also adjust the image quality by subjecting image data obtained from the imaging unit 20 to development processing, and appropriately set the hue, tone, and brightness and the like to complete a photograph that is suitable for viewing. In the present embodiment, a lookup table or the image processing circuit 40 can detect an object that is typified by the human face from inside an input image, and can obtain likelihood information with respect to a position, size, inclination and features or the like of a human face in an image. The image processing circuit 40 can extract characteristic information of a detected human face and authenticate whether the face is that of a specific individual. When performing authentication, the image processing circuit 40 reads out characteristic information of an individual that is stored in the ROM 48, and performs a matching process by comparing the characteristic information of the detected human face with the characteristic information that was read out from the ROM 48, and confirms whether or not the characteristic information of the detected human face matches that of a registered individual. The image processing circuit 40 can also perform detailed analysis of a human face, such as analyzing the eyes of the relevant person to detect the line-of-sight direction thereof.

A display apparatus 50 such as an LCD displays an image that has undergone development processing at the image processing circuit 40 or displays characters or icons, and thereby serves as an information conveying unit that conveys information to a user.

An external memory 90 can be inserted into the digital camera 100, and an external device 92 can be connected to the digital camera 100. The digital camera 100 can exchange images as well as command information for actuating the other party's device with the external memory 90 and the external device 92 through an external memory interface 52 and an external device interface 54.

A system control unit 42 performs overall control of the digital camera 100. An operating unit 44 includes operation members for allowing a user to perform various operations.

An electronic flash unit 30 is arranged at a suitable position of the digital camera 100. The electronic flash unit 30 can be caused to emit light by a light emission control circuit 32.

Figure 2A:
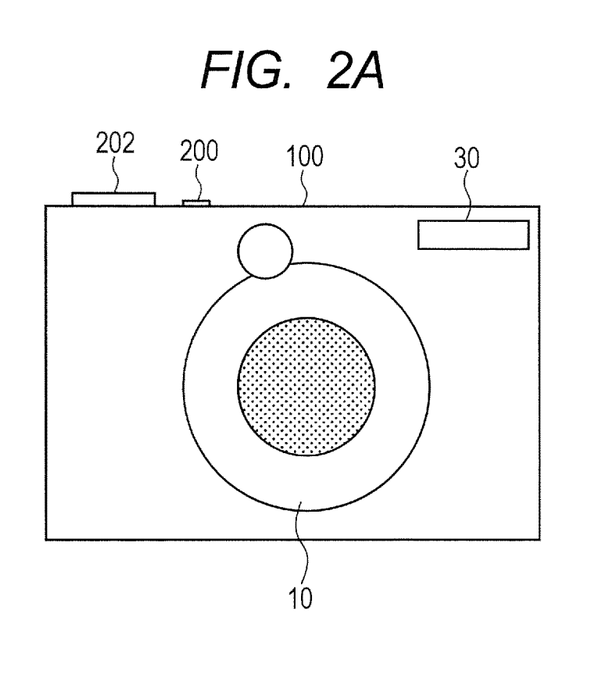
FIGS. 2A and 2B are views illustrating an example of the outward appearance of the digital camera according to the embodiment.
Figure 2B:
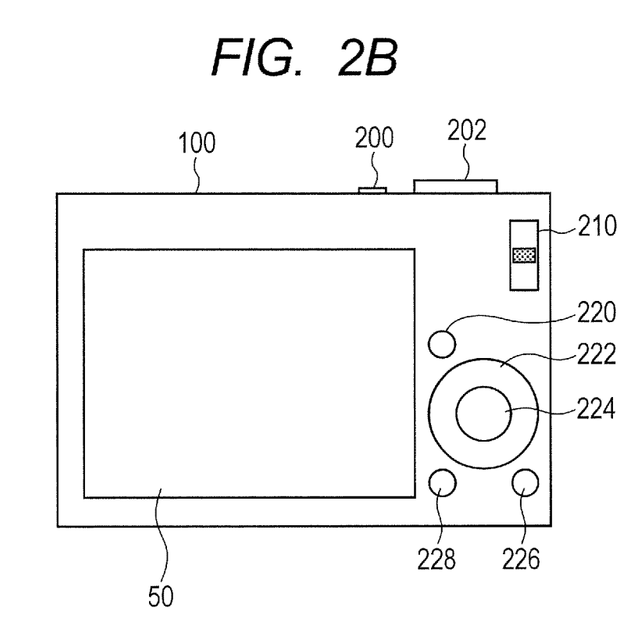

An example of the outer appearance of the digital camera 100 is illustrated in FIGS. 2A and 2B. FIG. 2A illustrates the front face of the camera, and FIG. 2B illustrates the back face of the camera. The lens 10 is disposed on the front face of the camera, and can capture an image of an object as a main camera. The electronic flash unit 30 is disposed on the same face as the lens 10. If the main object is dark, a sufficient quantity of light can be obtained by causing the electronic flash unit 30 to emit light, and thus a fast shutter speed can be maintained even in a dark environment, and a favorable image can be obtained. The display apparatus 50 is arranged on the back face of the camera. Operation members 200, 202, 210, 220, 222, 224, 226, and 228 constituting the operating unit 44 are utilized to activate functions in accordance with a user operation, such as turning on the power of the camera, switching the imaging mode, and setting various setting items.

A color conversion process for keeping a particular color of an image that is executed in the digital camera 100 having the above described configuration will now be described.

First, an example in which the user designates a desired object, and color conversion is performed so as to keep the color of the relevant object as a chromatic color will be described. As shown in FIG. 3A to FIG. 5B, it is assumed that two red automobiles 315 and 311, one blue automobile 313, and one green automobile 317 appear in an image. Among these automobiles, the color of a desired single automobile will be kept as a chromatic color, and other regions will be changed to an achromatic color.

Figure 3A:
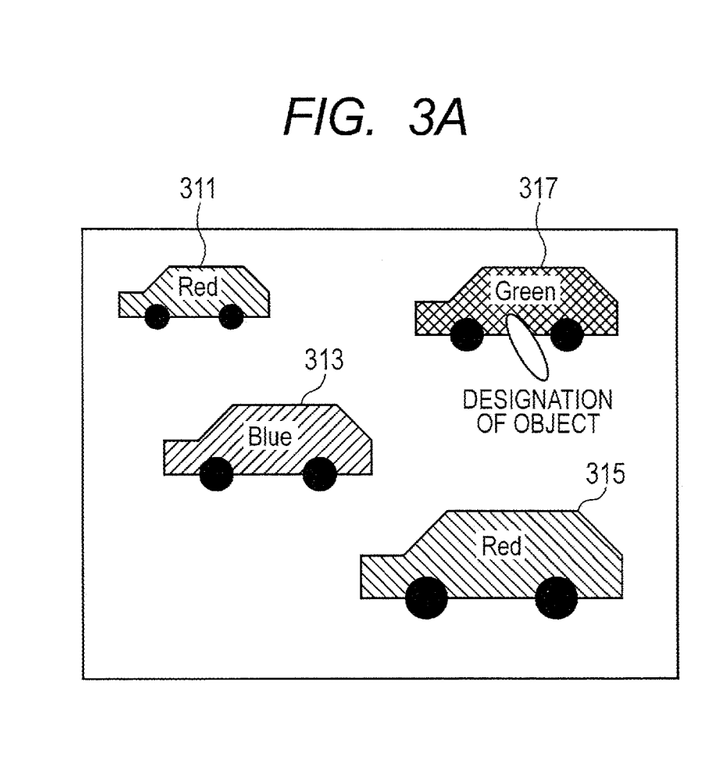
FIGS. 3A and 3B are views for describing an example of performing a color conversion process for keeping a color of an object designated by a user as a chromatic color.
Figure 3B:
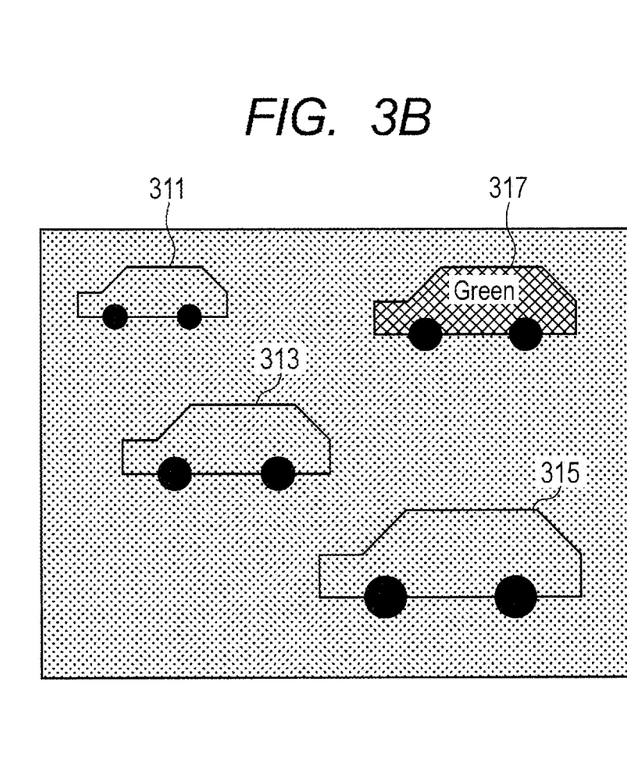

FIG. 3A illustrates the manner in which the green automobile 317 is designated so as to keep the color thereof as a chromatic color. When an object is designated, color information (in this case, it is assumed that the information is in RGB format) of the designated object is acquired from the image and is temporarily stored. In a color conversion process that is described later, a conversion parameter is generated so as to keep the temporarily stored color information as it is as a chromatic color, and change the other colors to an achromatic color. By using the conversion parameter, as shown in FIG. 3B, the image is subjected to color conversion into an image in which the green automobile 317 remains green and the colors of the other automobiles are changed to an achromatic color.

Figure 4A:
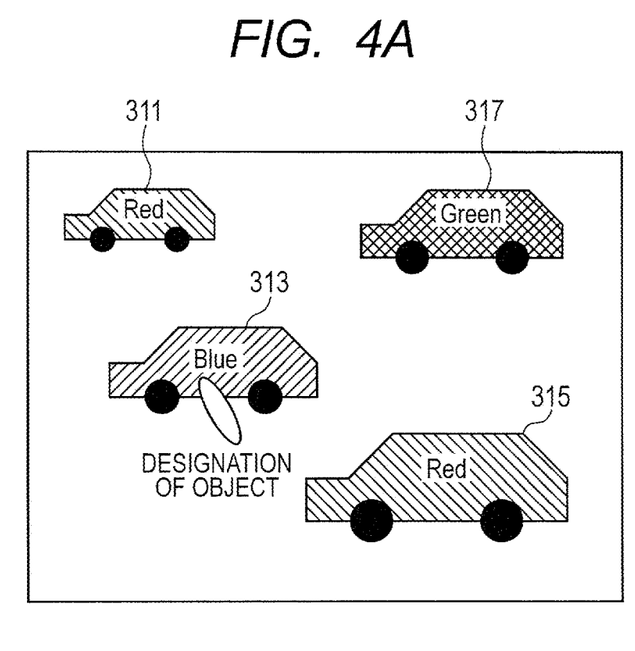
FIGS. 4A and 4B are views for describing an example of performing a color conversion process for keeping a color of an object designated by a user as a chromatic color.
Figure 4B:
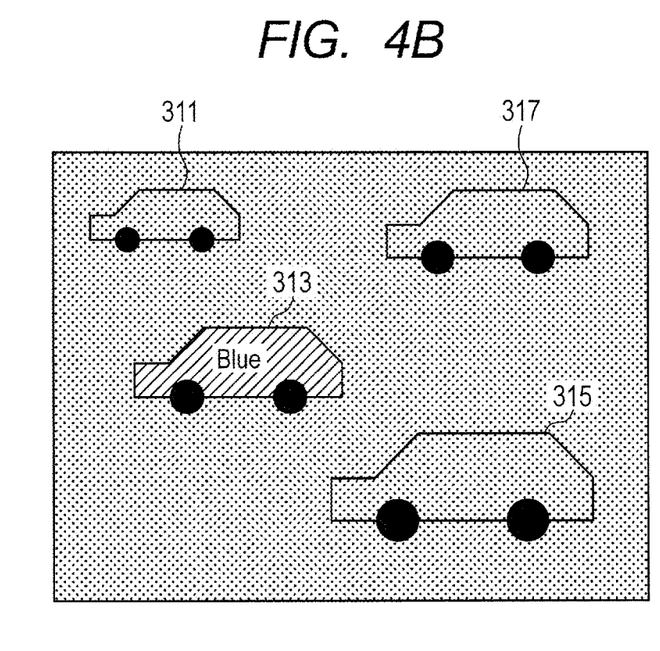

In FIG. 4A, the blue automobile 313 is designated by performing the same procedure as in FIG. 3A. Further, as shown in FIG. 4B, the image is subjected to color conversion into an image in which the blue automobile 313 remains blue and the colors of the other automobiles are changed to an achromatic color.

Figure 5A:
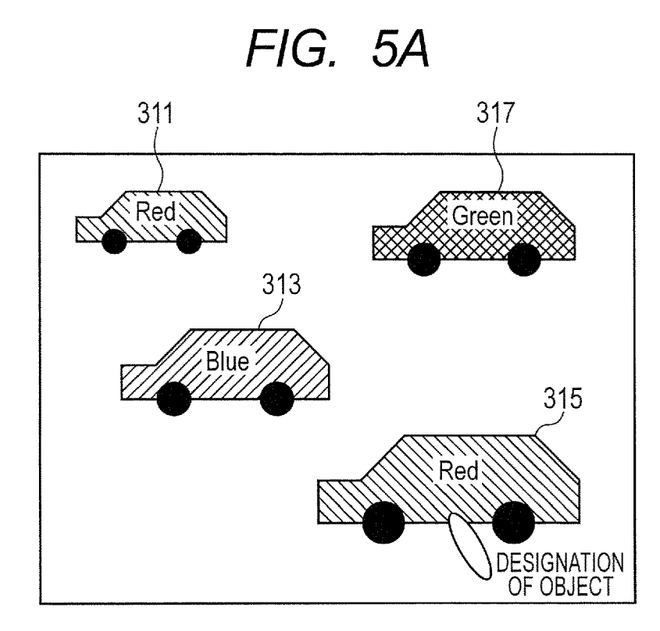
FIGS. 5A and 5B are views for describing an example of performing a color conversion process for keeping a color of an object designated by a user as a chromatic color.
Figure 5B:
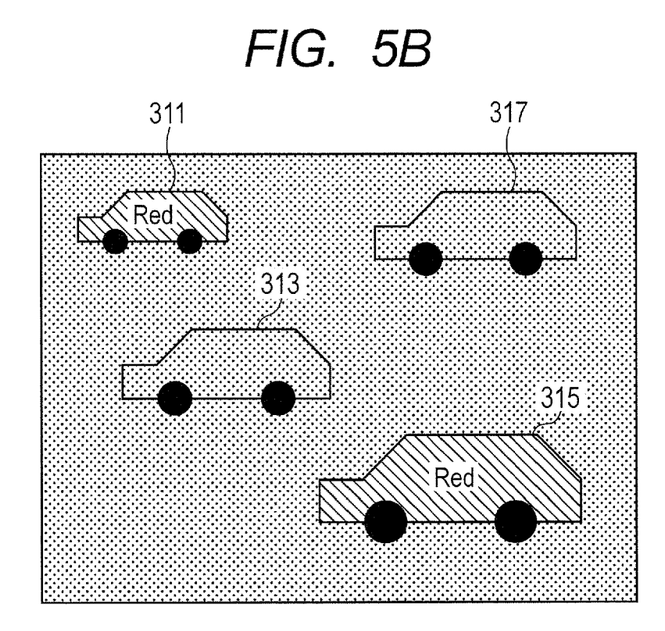

In FIG. 5A, the red automobile 315 is designated by performing the same procedure as in FIG. 3A and FIG. 4A. In this case, in addition to the red automobile 315 that it is desired to keep as a chromatic color, another red automobile 311 also exists in the image. When the color information of the automobile 315 is temporarily stored and the entire image is subjected to a color conversion process, as shown in FIG. 5B, naturally the automobile 315 remains red, and furthermore, the other red automobile 311 remains red also. In a case where the user desires to record only the frontward automobile 315 as a chromatic color, there is the problem that the automobile 311 at the rear is also recorded as a chromatic color and the result desired by the user is not obtained. A measure to overcome this problem is described later.

A color conversion process using a color conversion (three-dimensional) LUT (lookup table) will now be described referring to FIG. 6 with respect to the color conversion process illustrated in FIG. 3A to FIG. 5B.

Figure 6:
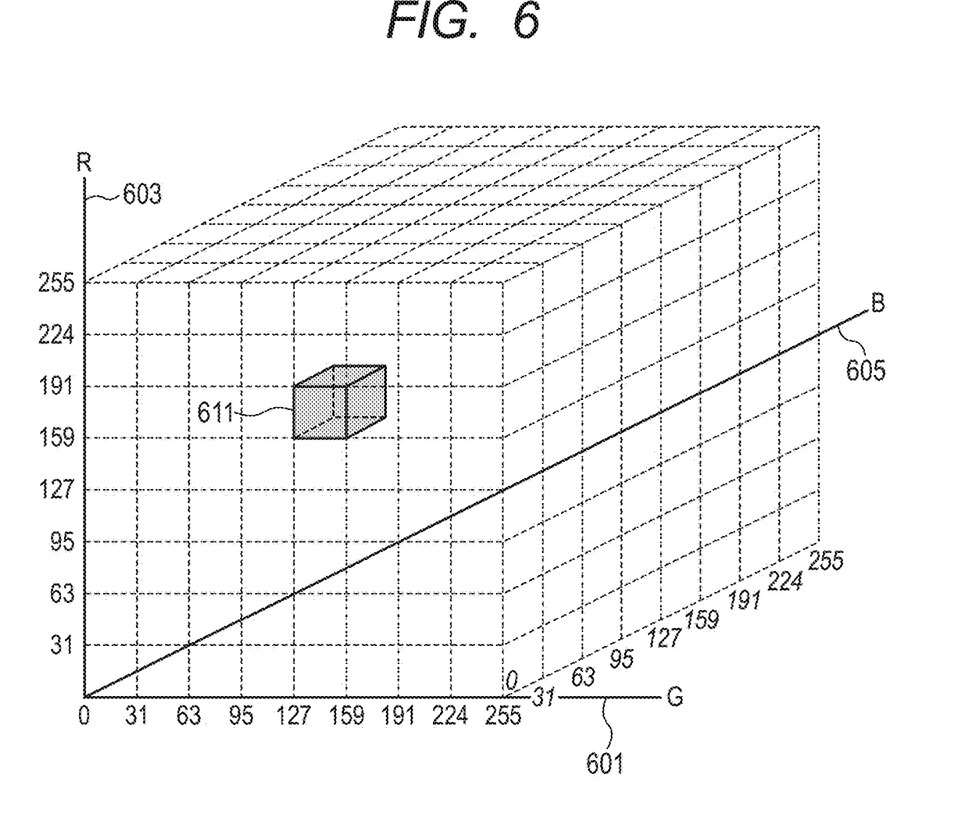
FIG. 6 is a view for describing a color conversion lookup table.

In FIG. 6, a color space is shown that includes three axes 601, 603, and 605 in which there are respective axes for R, G, and B. Each axis has 8-bit gradations from 0 to 255, and these are partitioned into eight regions of units. Since each axis includes eight regions, the total number of regions is 8×8×8=512. Note that, although a configuration having 512 regions is illustrated here, the present invention is not limited thereto, and a configuration can be adopted that is partitioned into an arbitrary number of regions in consideration of the maximum size of the color conversion LUT and the speed of searching the table and the like.

The color conversion LUT is formed by defining color information after color conversion in the respective regions. For example, in the case of a pixel for which an RGB signal value is R:G:B=165:150:20, the relevant pixel corresponds to a region 611 in the color conversion LUT in FIG. 6. It is assumed that color information after color conversion is previously defined for the region 611, and color conversion is performed in accordance with the color information. At this time, since there is a concern that the conversion accuracy may be too low depending on the number of regions into which the color conversion LUT is partitioned, for example, an interpolation operation such as a linear interpolation described below may be performed.

Example) Linear Interpolation $$R\_Out = R\_Target * R\_In / R\_Ref$$

$$G\_Out = G\_Target * G\_In / G\_Ref$$

$$B\_Out = B\_Target * B\_In / B\_Ref$$

R/G/B_In: Input value
R/G/B_Out: Output value
R/G/B_Ref: Reference value of relevant region
R/G/B_Target: Conversion value of relevant region A color conversion process is performed for each pixel of the image by means of the above described color conversion LUT and interpolation operation, and the image is thereby subjected to color conversion into an image in which an automobile designated by a user in the manner illustrated in FIG. 3A to FIG. 5B is kept as a chromatic color, and the other colors are changed to an achromatic color.

Here, in the example described with respect to FIG. 3A to FIG. 5B, it is necessary for a user to perform an operation to designate an object. There is also the problem that in a case where there is another object in the image that is the same color as the object designated by the user, as in the above example, the color of the other object is also kept. Further, there is the problem that, after the user confirms the color that is to be kept, if there is an environmental change or the like, the process to keep the color that is desired by the user will no longer be correctly performed.

According to the present embodiment, as described hereunder, a configuration is adopted that enables automatic generation of an image in which only an impressive color is kept, without requiring a complicated operation. The configuration of the present embodiment also solves the problem that the color of a different object that is the same color as the object designated by the user is also kept. Further, the configuration of the present embodiment solves the problem that, after the user confirms the color that is to be kept, if there is an environmental change or the like, the process to keep the color that is desired by the user will no longer be correctly performed.

Figure 7:
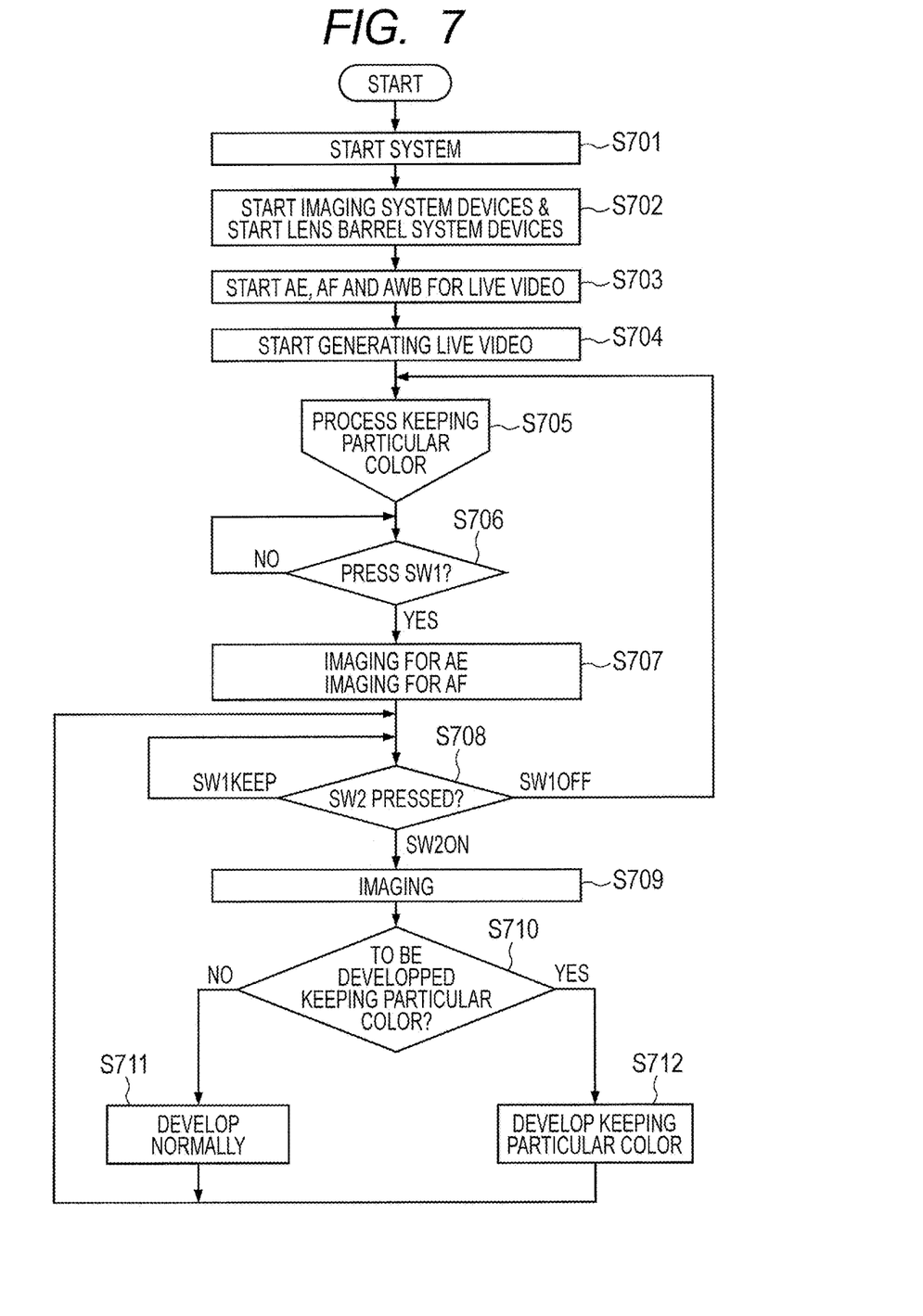
FIG. 7 is a flowchart illustrating overall processing performed by the digital camera according to the embodiment.

FIG. 7 illustrates overall processing performed by the digital camera 100 according to the present embodiment. The processing in the flowchart in FIG. 7 is executed under the control of the system control unit 42 and is started when the main power of the digital camera 100 is turned on.

In step S701, the system control unit 42 starts up the system. In this case, the basic system startup is performed, such as supplying power to a CPU or LSI that is required for the camera system to operate, starting the clock supply, and initializing the memory or OS.

In step S702, the system control unit 42 activates an imaging element such as a CCD or a CMOS included in the imaging unit 20, and activates lens barrel system devices such as a focusing lens or zoom lens included in the lens 10. A mechanical shutter or a mechanical diaphragm operates, and guiding of light from outside to the imaging unit 20 begins.

In step S703, the system control unit 42 measures the brightness, colors, and focusing state based on data that was read out from the imaging unit 20, and starts AE, AF, and AWB (auto white balance) processing to place the brightness, colors, and focusing state in a favorable state, respectively.

In step S704, the system control unit 42 starts to generate live video and displays the live video on the display apparatus 50.

In step S705, the system control unit 42 executes a process for keeping a particular color.

Figure 8:
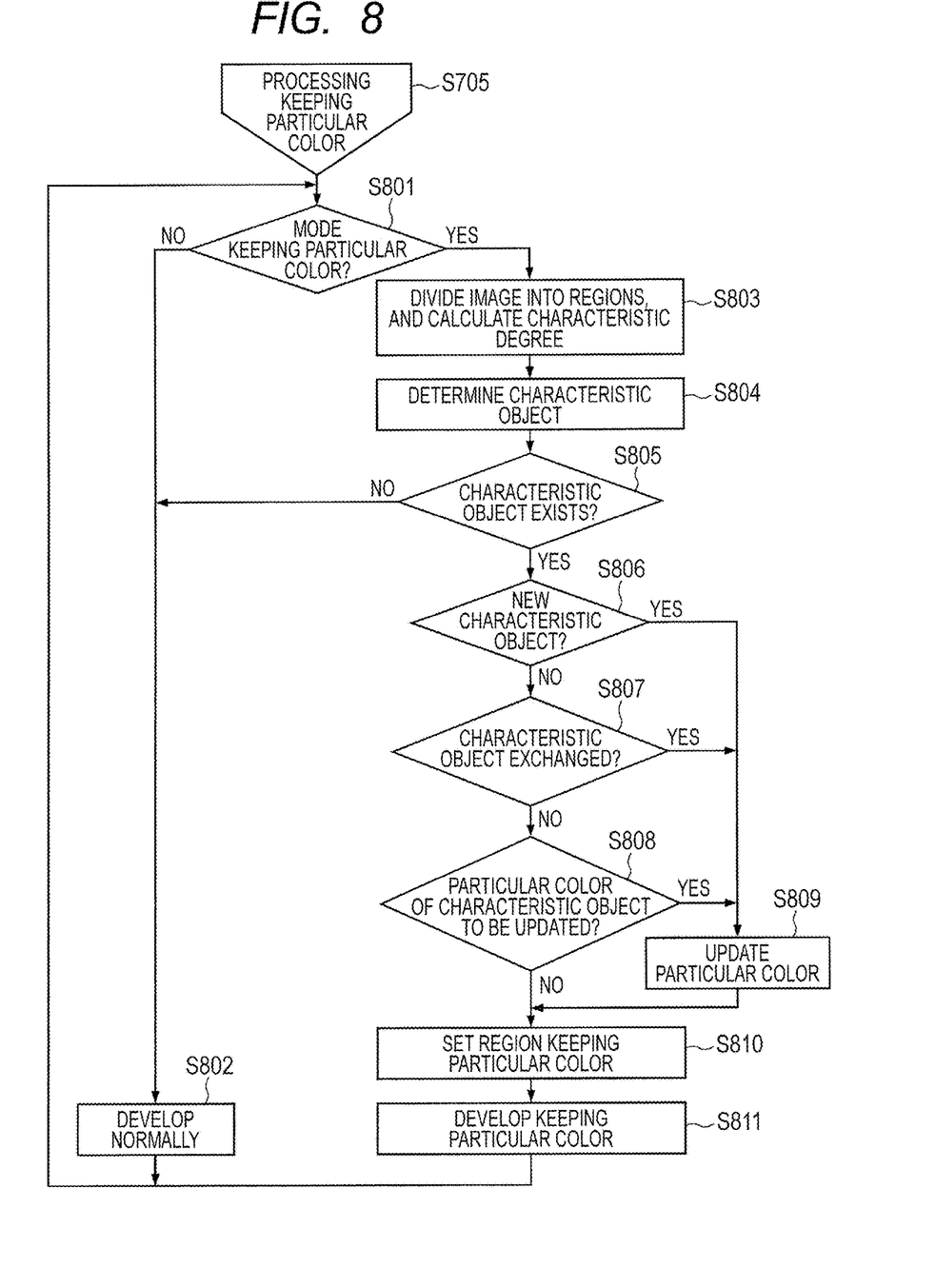
FIG. 8 is a flowchart illustrating details of a process for keeping a particular color in the flowchart in FIG. 7.

FIG. 8 illustrates details of the process for keeping a particular color that is executed in step S705.

First, the system control unit 42 determines whether or not the current mode is a mode for keeping a particular color (step S801). The camera has various imaging modes, and the mode for keeping a particular color can be provided as one of the various imaging modes. This depends on the form in which modes are provided in the camera, and a configuration may also be adopted in which a process for keeping a particular color can be selected in a form other than as a mode. If the system control unit 42 determines that the current mode is not the mode for keeping a particular color, the system control unit 42 performs normal development processing (step S802).

If it is determined that the current mode is the mode for keeping a particular color, the system control unit 42 divides the image into regions and calculates a characteristic degree for each region (step S803).

The processing in step S803 will now be described referring to FIGS. 9A to 9D.

Figure 9A:
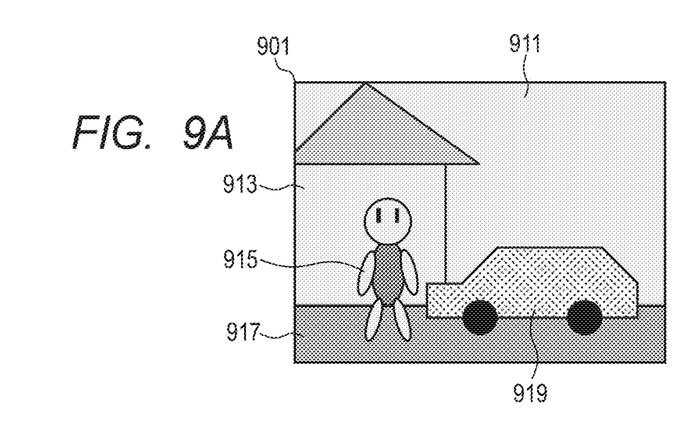
FIGS. 9A, 9B, 9C and 9D are views for describing the manner in which image data is analyzed.

As shown in FIG. 9A, a person 915, an automobile 919, a house 913, a sky 911, and a ground 917 appear in an image 901. The system control unit 42 controls so as to perform operations to analyze this kind of object configuration, and extract information indicating the objects that appear in the respective regions of the image.

Figure 9B:
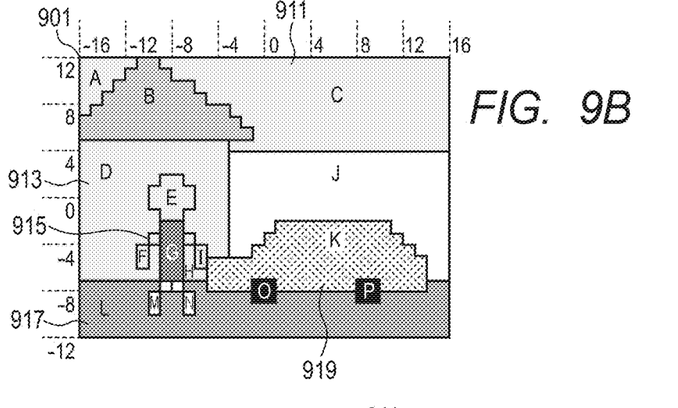

FIG. 9B illustrates the manner in which the image is divided into block shapes, and division into regions (grouping) is performed using color information and luminance information. Here, as one example, the image is divided into 32 blocks in the horizontal direction and into 24 blocks in the vertical direction. The image is divided into regions based on the color information and luminance information of each block. As a result, the person 915 is divided into the following regions: E=head, G=body, F and I=arms, and M and N=legs. Further, the automobile 919 is divided into the following regions: K=vehicle body, and O and P=tires. Division into regions is performed in this manner for the entire image.

Figure 9C:
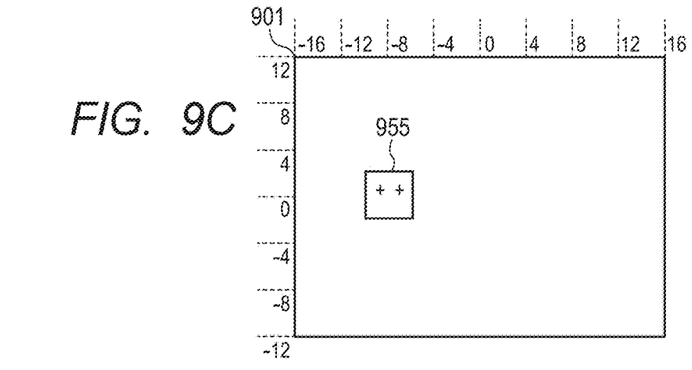

FIG. 9C is a view illustrating a result obtained by performing processing to detect an object from the image in FIG. 9A, and thereby detecting a face 955 of the person 915.

Figure 9D:
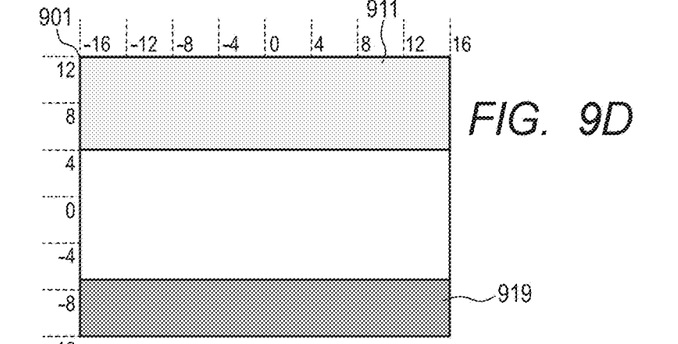

FIG. 9D illustrates results obtained by detecting the sky 911 and the ground 919 based on the color information and luminance information of predetermined regions of the image illustrated in FIG. 9A. According to this example, in a region covering approximately 30% of the image that is at the upper part of the image, the system control unit 42 checks whether blocks exist that satisfy a color condition for detecting a blue sky, and block that correspond to the condition are determined as being the region of the sky 911. The term "block" as used herein refers to the respective blocks illustrated in FIG. 9B. Determination of the ground region 919 is also performed in a similar manner.

Information showing the results of dividing the image into regions (FIG. 9B), detection results with respect to detection of a predetermined object from the image (FIG. 9C), and results of detecting a sky region and a ground region from each region obtained by dividing the image into regions (FIG. 9D) that was acquired in the above described manner is then summarized. Table 1 that is shown hereunder illustrates an example in which the respective items of information are summarized.

the ground does not include an object for which a color is to be kept, the degree of attention with respect to the region L is low, and hence a type value of −100 is allocated thereto.

An evaluation values "eva value" that is a characteristic degree of the respective regions A to P is calculated based on the following calculation formula using the distance "Δ center", the size, the chromaticness "chroma" and the type value of the respective regions A to P.

Eva Value=(Δcenter×Coef Dist)+(Size×Coef Size)+
(Chroma×Coef Chroma)+(Type Value)

It is assumed that arbitrary numerical values can be used for "Coef Dist", "Coef Size", and "Coef Chroma" as compound coefficients. In Table 1, the highest evaluation value among the evaluation values "eva value" calculated for the respective regions A to P is a value for a region K that corresponds to the position of the body of the automobile 919.

Returning to the description in FIG. 8, an object (characteristic object) that should be subjected to development processing for keeping a color is determined in accordance with the evaluation values "eva value" calculated in step S803 (step S804). For example, the respective evaluation values "eva value" are compared with a predetermined

TABLE 1

| Region | Center of gravity (central origin) x | y | Distance difference from origin Δ center | Size Size | Chromaticness Chroma | Object type | TypeValue | Evaluation value EvaValue |
|---|---|---|---|---|---|---|---|---|
| A | −14 | 10 | 17 | 15 | 60 | SKY | 20 | 702 |
| B | −9 | 8 | 12 | 63 | 50 | — | 0 | 662 |
| C | 4 | 8 | 9 | 165 | 60 | SKY | 20 | 977 |
| D | −10 | −1 | 10 | 120 | 0 | — | 0 | 270 |
| E | −8 | 0 | 8 | 12 | 30 | FACE | 0 | 348 |
| F | −11 | −4 | 12 | 3 | 30 | — | 0 | 341 |
| G | −8 | −4 | 9 | 10 | 80 | BODY | 100 | 947 |
| H | −7 | −5 | 9 | 4 | 0 | — | 0 | 34 |
| I | −6 | −4 | 7 | 3 | 30 | — | 0 | 328 |
| J | 6 | 1 | 6 | 139 | 0 | — | 0 | 296 |
| K | 6 | −5 | 8 | 89 | 80 | — | 0 | 1001 |
| L | 0 | −10 | 10 | 131 | 0 | GROUND | −100 | 192 |
| M | −10 | −8 | 13 | 3 | 30 | — | 0 | 344 |
| N | −7 | −8 | 11 | 3 | 30 | — | 0 | 338 |
| O | −1 | −7 | 7 | 4 | 0 | — | 0 | 29 |
| P | 8 | −7 | 11 | 4 | 0 | — | 0 | 40 |

In Table 1, respective regions A to P are shown on the vertical axis, and center of gravity information (X, Y) for each region, a distance "Δ center" from the origin of the center of gravity (center of the image) of each region, the size of each region, the chromaticness "chroma" of each region, and the object type of each region are shown on the horizontal axis. For example, sky, face, body and ground are defined as object types. A "type value" is also assigned in accordance with the object type. The type values are designed in accordance with the object kinds on which attention should be focused in an image, so that the higher the degree of attention that it is considered will be focused on an object is, the higher the value that is assigned as the type value. For example, a region G is a position below a region E that is the detection position of the human face, and there is a high probability that the region G is the body of the relevant person. It can be expected that color information regarding the clothes of the person can be acquired from the body region, and therefore a type value of 100 is assigned thereto. On the other hand, a region L that is located at the lower part in the image is the ground, and since it is clear that threshold value, and an object for which the "eva value" exceeds the threshold value is taken as a characteristic object.

Next, existence or non-existence of a characteristic object is determined (step S805). If it is determined that a characteristic object does not exist, normal development is performed (step S802).

If it is determined that a characteristic object exists, the system control unit 42 determines whether or not the characteristic object is a new characteristic object (step S806). If the system control unit 42 determines that the characteristic object is a new characteristic object, since the object in question will have been subjected to normal development up until the current process because the object had not been detected as a characteristic object, in order to subsequently perform development processing for keeping the color, the system control unit 42 updates and stores the particular color information that is to be kept (step S809).

Next, the system control unit 42 determines whether or not the characteristic object was switched to a different object from the state in which a characteristic object has already been found (step S807). In a case where a characteristic object has already been found, since development processing for keeping the color of the object will already have been performed, it is necessary to update and store the particular color information of the characteristic object that was switched to (step S809).

Next, the system control unit 42 determines whether or not to update the particular color of the characteristic object (step S808). If it is determined that the particular color should be updated, the system control unit 42 updates and stores the particular color information (step S809). Even in a state in which a characteristic object is not new or is not being switched to and development processing for keeping a color of the relevant object is already being performed, if a change in the environmental light, such as a change whereby the environmental light becomes brighter or becomes darker, causes a change in the particular color from a state at the time that the particular color was initially updated and stored, it will no longer possible to perform processing which correctly keeps only the particular color.

Figure 10A:
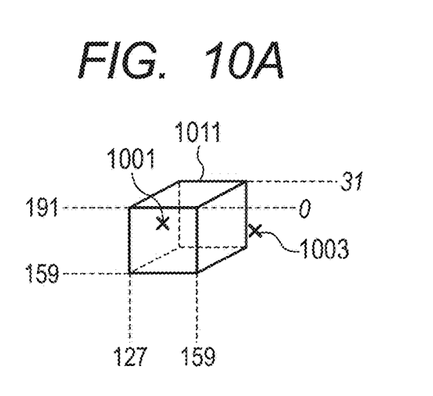
FIGS. 10A and 10B are views for describing color tracking in a color conversion lookup table.
Figure 10B:
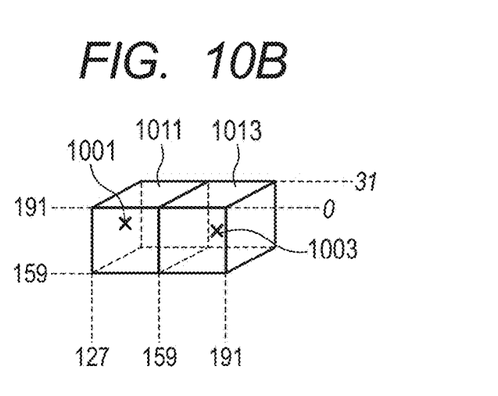

Here, the processing in step S808 will be described referring to FIGS. 10A and 10B. In FIG. 10A, reference numeral 1001 denotes particular color information that was originally updated and stored. Further, a color conversion LUT is generated so as to keep a region 1011 corresponding to the particular color information 1001 as a chromatic color. It is assumed that, thereafter, the color of the characteristic object changes due to a change in the environmental light or the like, and the particular color information 1001 is changed to particular color information 1003. Although the color conversion LUT was generated so as to keep the color of the region 1011 since the particular color information that was initially stored was the particular color information 1001, if the color conversion LUT is utilized as it is, color conversion will not be correctly performed after the particular color information 1001 has changed to the particular color information 1003. Therefore, the characteristic object is continually tracked by a tracking unit, and changes in the color of the characteristic object are monitored based on the tracking results. Consequently, when it is detected that the particular color has changed to a different region, at that timing the color conversion LUT is regenerated so as to keep a region 1013 corresponding to the particular color information 1003 as a chromatic color.

Figure 11:
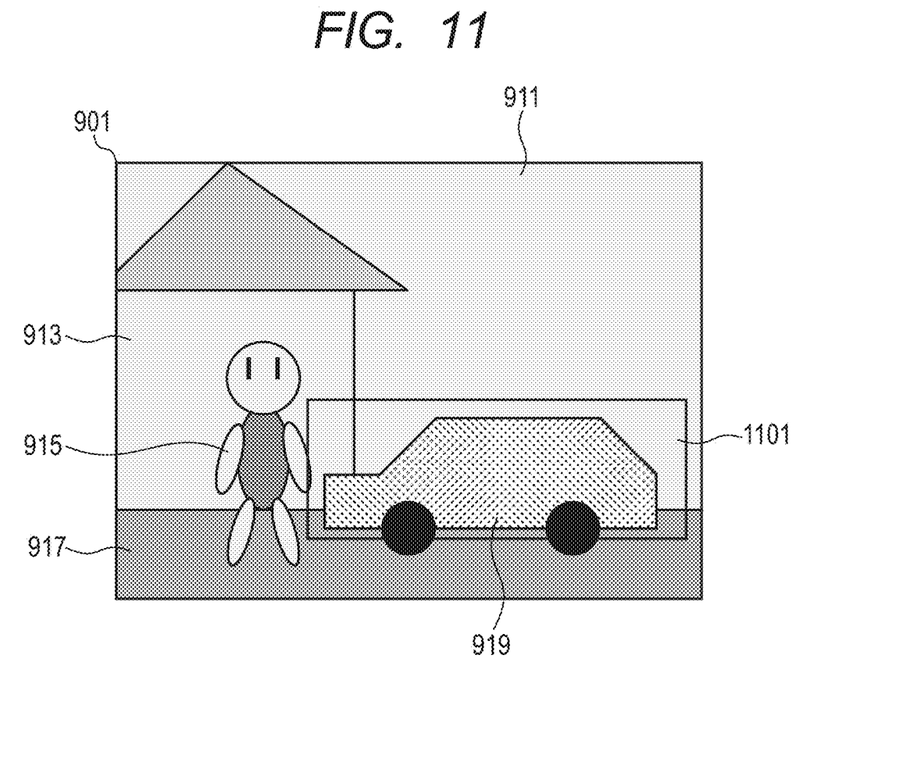
FIG. 11 is a view for describing an example of setting a region for keeping a color.

Returning to the description in FIG. 8, after updating and storing of particular information has been appropriately performed, setting of a region for keeping a color is performed (step S810). Next, development processing for keeping a color is performed so that the color in the region for keeping a color that was set in step S810 is kept, and colors of the other regions are changed to an achromatic color (step S811). When development processing for keeping a color is performed with respect to the entire image, there is the problem that if a different object that has the same color as the target object exists in the image, the color of the different object will also be kept. Therefore, as shown in FIG. 11, a region for keeping a color 1101 is set as a region on which to perform processing for keeping the color of the automobile 919, and the color conversion LUT is applied to the region for keeping a color 1101. Subsequently, a region other than the region for keeping a color 1101 is subjected to a color conversion process for changing the relevant colors to an achromatic color. As a result, even if there is a different object that is the same color as the body of the automobile 919 in the image, the color of the relevant object can be changed to an achromatic color and only the color of the body of the automobile 919 that is the only color the user wishes to keep can be kept as a chromatic color.

Returning to the description in FIG. 7, in step S706 the system control unit 42 determines whether or not a switch SW1 was pressed as an instruction to perform imaging of a still image. If the switch SW1 was pressed, in step S707 the system control unit 42 performs AE processing that determines the exposure for imaging a still image, and AF processing that adjusts the focus. In step S708, the system control unit 42 determines whether or not a switch SW2 was pressed. If the switch SW2 was pressed, in step S709 the system control unit 42 performs an imaging process. Image data obtained by photoelectric conversion at the imaging unit 20 is subjected to development processing for visualizing the image data, and in step S710 the system control unit 42 determines whether or not to perform development processing for keeping a color. This determination is made using a result determined with respect to development for keeping a color that was determined before the switch SW1 was pressed, as described above referring to FIG. 8. In a case where development processing for keeping a color is not to be performed, the system control unit 42 proceeds to step S711 in which normal development is performed. On the other hand, if development processing for keeping a color is to be performed, the system control unit 42 proceeds to step S712 in which the development processing for keeping a color is performed.

As described above, image processing can be performed that automatically detects a characteristic object, keeps the color of the characteristic object, and changes the colors of regions other than the region of the characteristic object to an achromatic color.

Further, even if a change arises in environmental light or the like, it is possible to continue to correctly perform the processing for keeping a color by automatically updating the particular color of the characteristic object.

The present invention has been described in detail above based on an exemplary embodiment thereof. However, it should be understood that the present invention is not limited to the specific embodiment described above, and the present invention also includes various forms within a range that does not depart from the spirit and scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261317, filed Dec. 18, 2013, which is hereby incorporated by reference herein in its entirety.

What is claimed is:

1. An image processing apparatus comprising:
   an imaging sensor configured to acquire images including a first image and a second image;
   a memory configured to store information regarding a color kept as a chromatic color; and
   a processor configured to execute processes including processes to:
      divide the first image into object regions corresponding to objects, using at least a color information;
      calculate an evaluation value indicating a characteristic degree of the object in the first image per each of the object regions;
      determine a characteristic object based on the evaluation value calculated by the calculating unit; and
      track the characteristic object determined by the determining unit;
   wherein the processor is further configured to subject the first image to a color conversion process, to keep a color of the characteristic object as the chromatic color in the object region including the characteristic object, in accordance with the information stored in the memory regarding the color kept as the chromatic color, and to change a color of the object to an achromatic color in the object region without including the characteristic object; and
   wherein responsive to detection of a color change of the tracked characteristic object in the second image after the first image;
      the information stored in the memory regarding the color which the processor keeps as the chromatic color is updated, according to the color change of the tracked characteristic object, and
      the processor performs the color conversion process without determining the characteristic object for a color conversion process against the second image by using the information stored in the memory after the updating.

2. The image processing apparatus according to claim 1, wherein the evaluation value is calculated by weighting according to a kind of the object.

3. The image processing apparatus according to claim 1, wherein the evaluation value is calculated based on at least one of a position, a size and a chromaticness.

4. The image processing apparatus according to claim 1, further comprising an image processing circuit configured to detect a human face as the object from the image,
   wherein, when the image processing circuit detects the human face, the evaluation value is calculated in an object region under the object region in which the human face is detected, as being larger than the evaluation value without detecting the human face.

5. The image processing apparatus according to claim 1, wherein the color conversion process to change the color of the object to the achromatic color is to reduce chromaticness of the color of the object.

6. The image processing apparatus according to claim 1, wherein the processor performs the color conversion process such that the color of the object other than the characteristic object is changed to the achromatic color, even when the color of the characteristic object is the same as the color of the object other than the characteristic object in the first image.

7. An image processing method comprising:
   acquiring images including a first image and a second image;
   dividing the first image into object regions corresponding to objects, using at least a color information;
   calculating an evaluation value indicating a characteristic degree of the object in the first image per each of the object regions;
   determining a characteristic object based on the evaluation value calculated;
   tracking the characteristic object determined in the determining;
   subjecting the first image to a color conversion process, to keep a color of the characteristic object as a chromatic color in the object region including the characteristic object, and to change a color of the object to an achromatic color in the object region without including the characteristic object; and
   storing information regarding the color which is kept as the chromatic color in the subjecting step,
   wherein responsive to detection of a color change of the tracked characteristic object in the second image after the first image;
      in the subjecting step, the information regarding the color kept as the chromatic color is updated according to the color change of the tracked characteristic object, and
      in the subjecting step, the color conversion process is performed without determining the characteristic object for a color conversion process against the second image by using the information stored after the updating.

* * * * *